(12) United States Patent
He et al.

(10) Patent No.: US 11,789,732 B2
(45) Date of Patent: *Oct. 17, 2023

(54) ARITHMETIC LOGIC UNIT REGISTER SEQUENCING

(71) Applicant: ADVANCED MICRO DEVICES, INC., Santa Clara, CA (US)

(72) Inventors: Bin He, Orlando, FL (US); Jiasheng Chen, Orlando, FL (US); Jian Huang, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/574,026

(22) Filed: Jan. 12, 2022

(65) Prior Publication Data

US 2022/0171621 A1 Jun. 2, 2022

Related U.S. Application Data

(63) Continuation of application No. 16/696,108, filed on Nov. 26, 2019, now Pat. No. 11,237,827.

(51) Int. Cl.
*G06F 12/02* (2006.01)
*G06F 9/30* (2018.01)
*G06F 7/57* (2006.01)
*G06F 9/48* (2006.01)

(52) U.S. Cl.
CPC ............. *G06F 9/3001* (2013.01); *G06F 7/57* (2013.01); *G06F 9/3009* (2013.01); *G06F 9/30101* (2013.01); *G06F 9/4806* (2013.01)

(58) Field of Classification Search
CPC ...... G06F 9/3012; G06F 9/3824; G06F 9/383; G06F 9/3001; G06F 7/57; G06F 9/3009; G06F 9/30101; G06F 9/4806
See application file for complete search history.

(56) References Cited

U.S. PATENT DOCUMENTS

| | | | |
|---|---|---|---|
| 2002/0019928 A1* | 2/2002 | Saulsbury | G06F 9/3851 712/E9.02 |
| 2011/0258415 A1* | 10/2011 | Chou | G06F 9/3861 712/216 |

OTHER PUBLICATIONS

International Preliminary Report on Patentability dated Jun. 9, 2022 for PCT/US2020/061977, 6 pages.

* cited by examiner

*Primary Examiner* — Hau H Nguyen

(57) ABSTRACT

A graphics processing unit (GPU) sequences provision of operands to a set of operand registers, thereby allowing the GPU to share at least one of the operand registers between processing. The GPU includes a plurality of arithmetic logic units (ALUs) with at least one of the ALUs configured to perform double precision operations. The GPU further includes a set of operand registers configured to store single precision operands. For a plurality of executing threads that request double precision operations, the GPU stores the corresponding operands at the operand registers. Over a plurality of execution cycles, the GPU sequences transfer of operands from the set of operand registers to a designated double precision operand register. During each execution cycle, the double-precision ALU executes a double precision operation using the operand stored at the double precision operand register.

20 Claims, 6 Drawing Sheets

ARITHMETIC LOGIC UNIT REGISTER SEQUENCING

CROSS-REFERENCE TO RELATED APPLICATIONS

The present application is a Continuation application of U.S. patent application Ser. No. 16/696,108, entitled "ARITHMETIC LOGIC UNIT REGISTER SEQUENCING", and filed on Nov. 26, 2019, the entirety of which is incorporated by reference herein.

BACKGROUND

A processor employs one or more processing units that are specially designed and configured to perform designated operations on behalf of the processor. For example, some processors employ a graphics processing unit (GPU) to perform graphics and vector processing operations. A central processing unit (CPU) of the processor provides commands to the GPU, and a command processor (CP) of the GPU decodes the commands into one or more operations. Execution units of the GPU, such as one or more arithmetic logic units (ALUs), execute the operations to perform the graphics and vector processing operations. The ALUs employ operand registers to store operands for processing. In particular, as threads execute at the GPU, the threads store operands at the operand registers and provide op codes or other control information to the ALUs to control the mathematical operations executed by the ALUs using the operands. Using a large number of operand registers allows the GPU to support concurrent execution of a relatively large number of threads. However, such a large number of operand registers consumes a high amount of processing resources, including power and circuit area.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate techniques wherein a graphics processing unit (GPU) sequences provision of operands to a set of operand registers, thereby allowing the GPU to share at least one of the operand registers between processing. The GPU includes a plurality of arithmetic logic units (ALUs) with at least one of the ALUs configured to perform double precision operations. The GPU further includes a set of operand registers configured to store single precision operands. For a plurality of executing threads that request double precision operations, the GPU stores the corresponding operands at the operand registers. Over a plurality of execution cycles, the GPU sequences transfer of operands from the set of operand registers to a designated double precision operand register. During each execution cycle, the double-precision ALU executes a double precision operation using the operand stored at the double precision operand register. By sequencing provision of operands between the registers in this way, the GPU allows multiple processing blocks (e.g., multiple vector shader processors) to share the double precision operand register, reducing the circuit area and power consumed by the operand registers.

Figure 1:
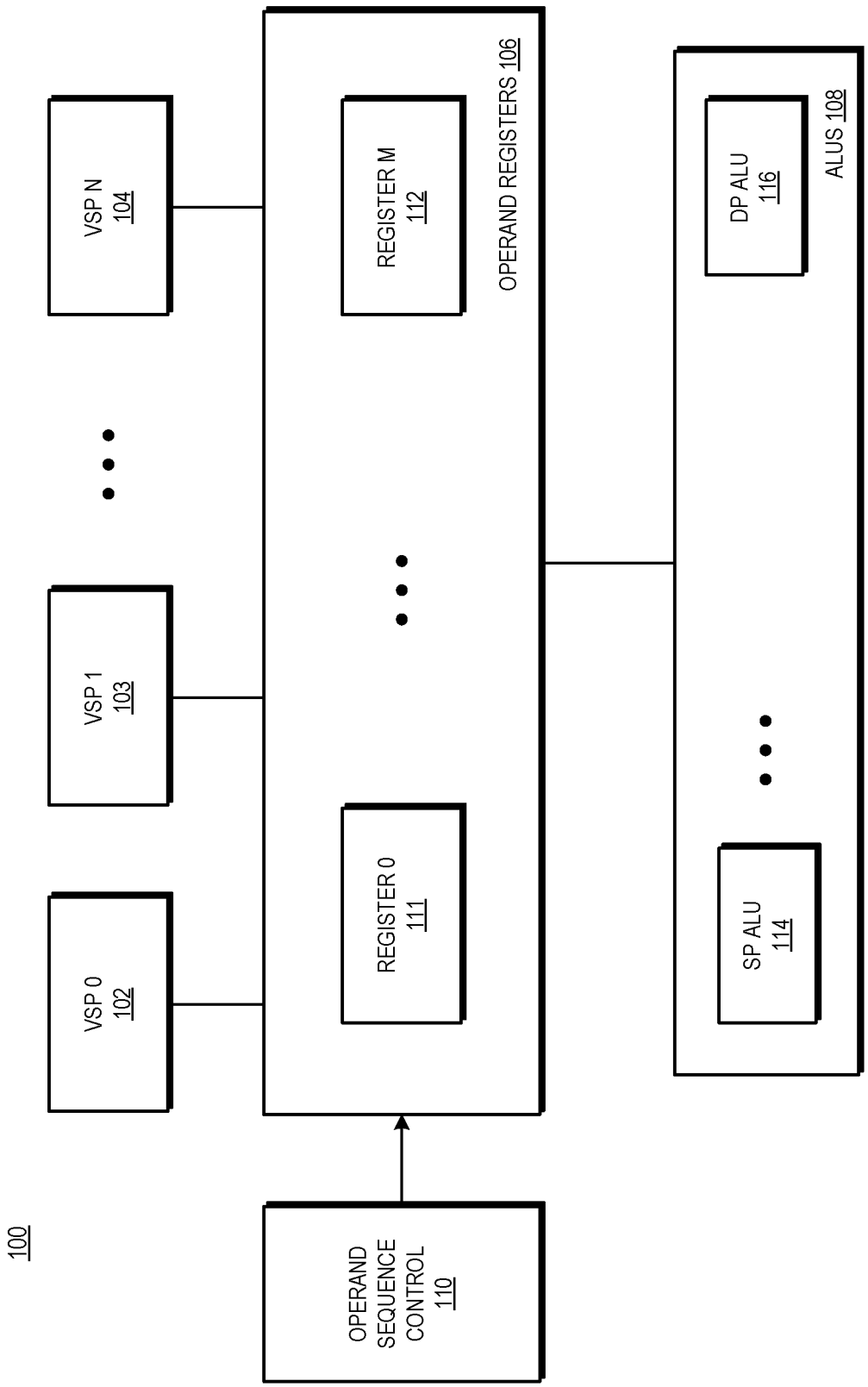
FIG. 1 is a block diagram of a graphics processing unit (GPU) configured to sequence provision of operands from one set of operand registers to another set of operand registers in accordance with some embodiments.

FIG. 1 illustrates a GPU 100 that supports sequencing of operand provision for double precision mathematical operations in accordance with some embodiments. For purposes of description, it is assumed that the GPU 100 is part of a processor that executes sets of instructions (e.g. computer programs) to carry out tasks on behalf of an electronic device. Thus, in different embodiments the GPU 100 is part of an electronic device such as a desktop computer, laptop computer, server, tablet, smartphone, game console, and the like. Further, it is assumed that the processor including the GPU 100 includes a central processing unit (CPU) that executes the sets of instructions.

The GPU 100 is designed and manufactured to carry out specified operations on behalf of the CPU. In particular, the GPU 100 performs graphics and vector processing operations on behalf of the CPU. For example, in some embodiments, in the course of executing instructions the CPU generates commands associated with graphics and vector processing operations. The CPU provides the commands to the GPU 100, which employs a command processor (not shown) to decode the commands into sets of instructions for execution at the GPU 100.

To facilitate execution of instructions, the GPU 100 includes a plurality of compute units, such as one or more single instruction multiple data (SIMD) blocks, with each SIMD block configured to execute a corresponding thread of operations. In some embodiments, the command processor of the GPU decodes the commands received from the CPU and, based on the commands, generates and schedules the sets of threads to be executed at the SIMD blocks. Each SIMD block includes a plurality of vector shader processors (VSPs) (e.g. VSPs 102, 103, 104). In some embodiments, each SIMD block includes four different VSPs, thereby supporting concurrent execution of four different threads. Thus, assuming each compute unit includes four SIMD blocks, with each SIMD block including four VSPs, each compute unit supports concurrent execution of sixteen threads.

During execution, the threads generate mathematical operations for execution with corresponding operands. To support execution of the mathematical operations, the GPU 100 includes a set of operand registers 106 (e.g., operand registers 111, 112) and a set of ALUs 108 (e.g., ALUs 114, 116). The operand registers 106 store operands for the mathematical operations and the ALUs 108 execute the mathematical operations using the stored operands. In particular, to execute a mathematical operation a thread stores the corresponding operands at one of the operand registers 106, as described further below, and provides control information (not shown) to one of the ALUs 108. Based on the control information, the ALU executes a mathematical operation using the stored operand and stores the result at a result register (not shown) for retrieval by the thread.

Figure 2:
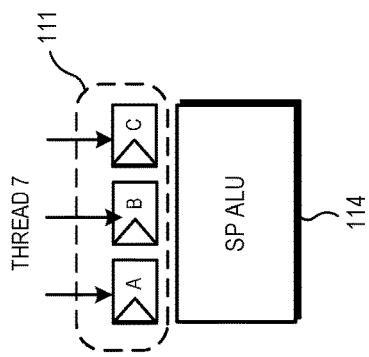
FIG. 2 is a block diagram illustrating provision of an operand to a register of the GPU of FIG. 1 in accordance with some embodiments.

It will be appreciated that, for clarity of illustration, each of the operand registers 106 is illustrated herein as a single block. However, in some embodiments each of the operand registers 106 stores multiple operands. An example is illustrated at FIG. 2, which depicts operand register 111 that stores operands for ALU 114. In the depicted embodiment, the operand register 111 stores three operands, designated "A", "B", and "C" respectively for a corresponding thread.

Returning to FIG. 1, it will be appreciated that the Figure illustrates the operand registers 106 and the ALUs 108 as being shared among the VSPs 102-104. However, in other embodiments one or more of the operand registers 106, or one or more of the ALUs 108, are dedicated to an individual VSP. Thus, for example, in some embodiments a subset of the operand registers 106 is assigned to the VSP 102 and a different subset of the operand registers is assigned to the VSP 103, such that each VSP is not able to use operand registers assigned to another VSP. Similarly, in some embodiments a subset of the ALUs 108 is assigned to the VSP 102 and a different subset of the ALUs 108 is assigned to the VSP 103, such that each VSP is not able to assign mathematical operations to an ALU assigned to a different VSP.

In some embodiments, at least some of the different mathematical operations generated by the executing threads are associated with different precisions, indicating a level of precision of the corresponding operand. For example, in some embodiments the executing threads generate single precision mathematical operations and double precision mathematical operations, with the double precision operands (that is, the operands used for the double precision operations) being twice as large as the single precision operands. Each of a subset of the operand registers 106 is sized to store single precision operands, while each of another subset of the operand registers 106 is sized to store double precision operands. In some embodiments, and as described in more detail below, the single precision operand registers of the operand registers 106 store portions of double precision operands while those operands await processing by one or more of the ALUs 108.

Figure 3:
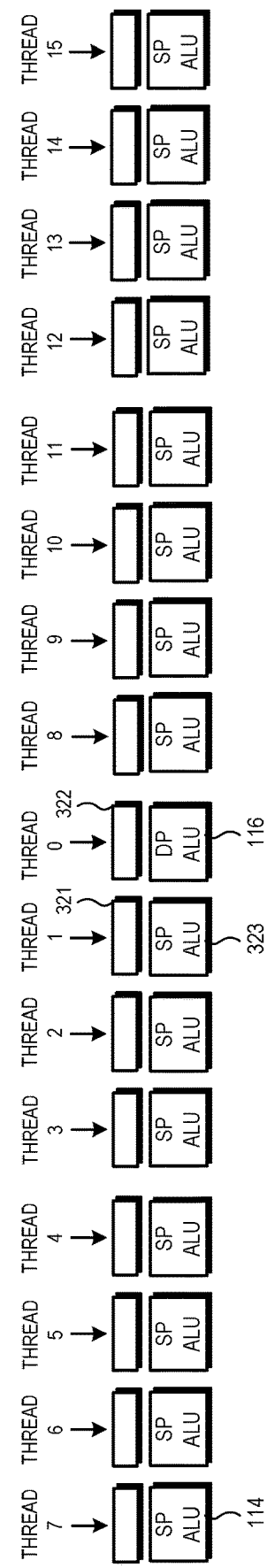
FIG. 3 is a block diagram illustrating a configuration of operand registers and corresponding ALUs of the GPU of FIG. 1 in accordance with some embodiments.

Each of a subset of the ALUs 108 includes circuitry to execute mathematical operations at a corresponding precision, using operands of that precision. Thus, for example, the ALU 114 includes circuitry to execute single precision mathematical operations (using single precision operands) and the ALU 116 includes circuitry to execute double precision operations (using double precision operands). In some embodiments, the threads executing at the GPU 100 are expected to request relatively high number of single precision operations, and to request a relatively low number of double precision operations. Accordingly, the ALUs 108 include a higher number of single precision ALUs and a lower number of double precision ALUs. Further, the operand registers 106 include a higher number of single precision operand registers and a lower number of operand registers that store double precision operands. An example is illustrated at FIG. 3 in accordance with some embodiments. In the depicted example, the ALUs 108 include 15 single precision (SP) ALUs and one double precision ALU. The operand registers 106 include a plurality of single precision operand registers, with one pair of operand registers, designated operand registers 321 and 322, storing double precision operands for the double precision ALU 116. In some embodiments, the operand register 321 stores the "high", or most significant, bits of the double precision operands and the operand register 322 stores the "low", or least significant bits of the double precision operands. In some embodiments, at different times the registers 321 and 322 also store single precision operands for one or more of the SP ALUs. That is, depending on the precision of a given arithmetic operation being executed, the registers 321 and 322 either store single precision operands for processing by one or more SP ALUs (e.g. SP ALU 323), or together store a set of double precision for processing by the DP ALU 116.

As noted above, in many cases the GPU 100 is expected to execute a relatively high number of single precision operations and to execute a relatively low number of double precision operations. Accordingly, to save on the costs of having a dedicated set of double precision registers for each executing thread, the GPU 100 includes an operand sequence control module 110 to control sequencing of double precision operands to the registers 321 and 322. To illustrate, in some embodiments at least a subset of the operand registers is connected and, in response to control signaling from the operand sequence control module 110, each operand register receiving the control signal transfers its stored data to another operand register. By controlling the transfer of data between the operand registers, the operand sequence control module 110 schedules execution of double precision operations for a plurality of threads over a plurality of execution cycles while using a relatively small number of operand registers and double precision ALU circuitry, thereby conserving resources of the GPU 100. In some embodiments, the operand sequence control module 110 is part of a scheduler (not shown) of the GPU 100 that schedules execution of threads at the VSPs 102-104.

FIGS. 4-7 together illustrate an example of the GPU 100 sequencing provision of double precision operands to the registers 321 and 322 in accordance with some embodiments. The example of FIGS. 4-7 illustrate a plurality of execution cycles of the GPU 100. In some embodiments, each execution cycle corresponds to a single clock cycle of a clock (not shown) used to synchronize operations of the GPU 100. In other embodiments, each execution cycle corresponds to multiple clock cycles. For the purposes of the example of FIGS. 4-7, it is assumed that the VSPs 102-104 are collectively, and concurrently, executing sixteen threads, each of which requires a double precision arithmetic operation to be executed at the DP ALU 116. To execute the operations, the GPU employs operand registers 430-439, as well as operand registers 321 and 322, of the operand registers 106. It is assumed that in some embodiments each of the operand registers 321, 322, and 430-439 includes independent read and write ports, so that data is read from and written to an operand register during a single execution cycle.

For purposes of the example, it is assumed that each executing thread provides one set of double precision operands for processing at the DP ALU 116. As explained further below, each thread provides the corresponding double precision operands in two portions: a lower portion, representing the least significant bits of the double precision operands, and an upper portion, representing the most significant bits of the double precision operands. Thus, assuming that each double precision operand is 64 bits, the upper portion of an operand is the 32 most significant bits of the operand and the lower portion of the operand is the 32 least significant bits of the operand.

Figure 4:
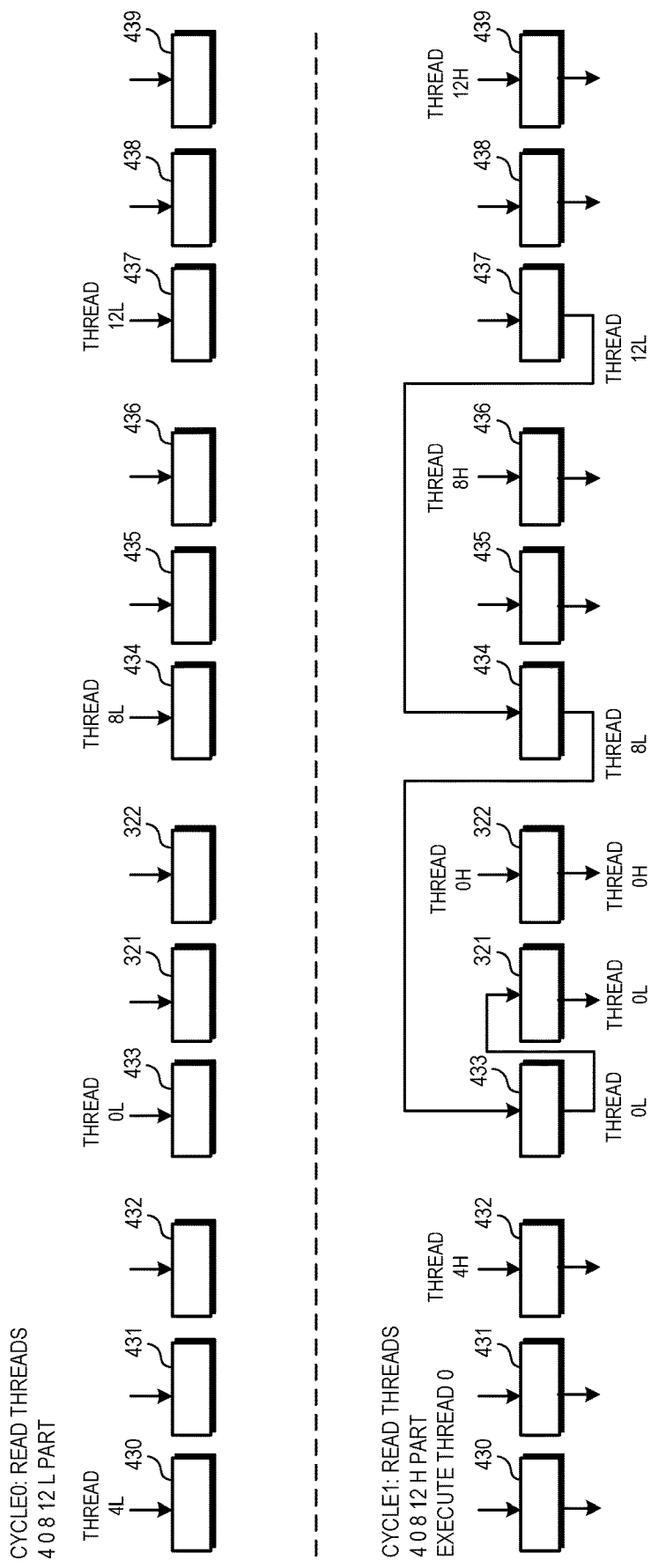
FIG. 4 is a block diagram illustrating a portion of an example sequencing of operand provision at the operand registers of FIG. 3 in accordance with some embodiments.

FIG. 4 illustrates the first two execution cycles of the example, designated CYCLE0 and CYCLE1, in accordance with some embodiments. During CYCLE0, the scheduler of the GPU 100 schedules execution of threads 0, 4, 8, and 12 so that the lower portion of the double precision operands for these threads (designated 0L, 4L, 8L, and 12L, respectively) are read into operand registers. In particular, lower portion operand 4L is stored at operand register 430, lower portion operand 0L is stored at operand register 433, lower portion operand 8L is stored at operand register 434, and lower portion operand 12L is stored at operand register 437. In at least some embodiments, each of the threads 0, 4, 8, and 12 is executed at a different VSP of the GPU 100.

During CYCLE1, the operand sequence control module 110 provides control signaling to transfer data between the operand registers. In particular, operand 0L is transferred from operand register 433 to operand register 321, operand 8L is transferred from operand register 434 to operand register 433, and operand 12L is transferred from operand register 437 to operand register 434.

In addition, during CYCLE1, the upper portion of the double precision operands for threads 0, 4, 8, and 12 (designated 0H, 4H, 8H, and 12H, respectively) are read into a subset of the operand registers. In particular, upper portion operand 4H is stored at operand register 432, upper portion operand 0H is stored at operand register 322, upper portion operand 8H is stored at operand register 436, and upper portion operand 12H is stored at operand register 439.

During CYCLE1, the 0L and 0H operands are stored at the operand registers 321 and 322 and are therefore ready for processing by the DP ALU 116. Accordingly, during CYCLE1, the DP ALU 116 initiates the double precision operation requested by Thread 0 using the 0L and 0H operands. In particular, the DP ALU 116 concatenates the upper and lower portions of the A, B, and C operands based on the 0L and 0H operands and employs the resulting A, B, and C operands for the double precision operation.

Figure 5:
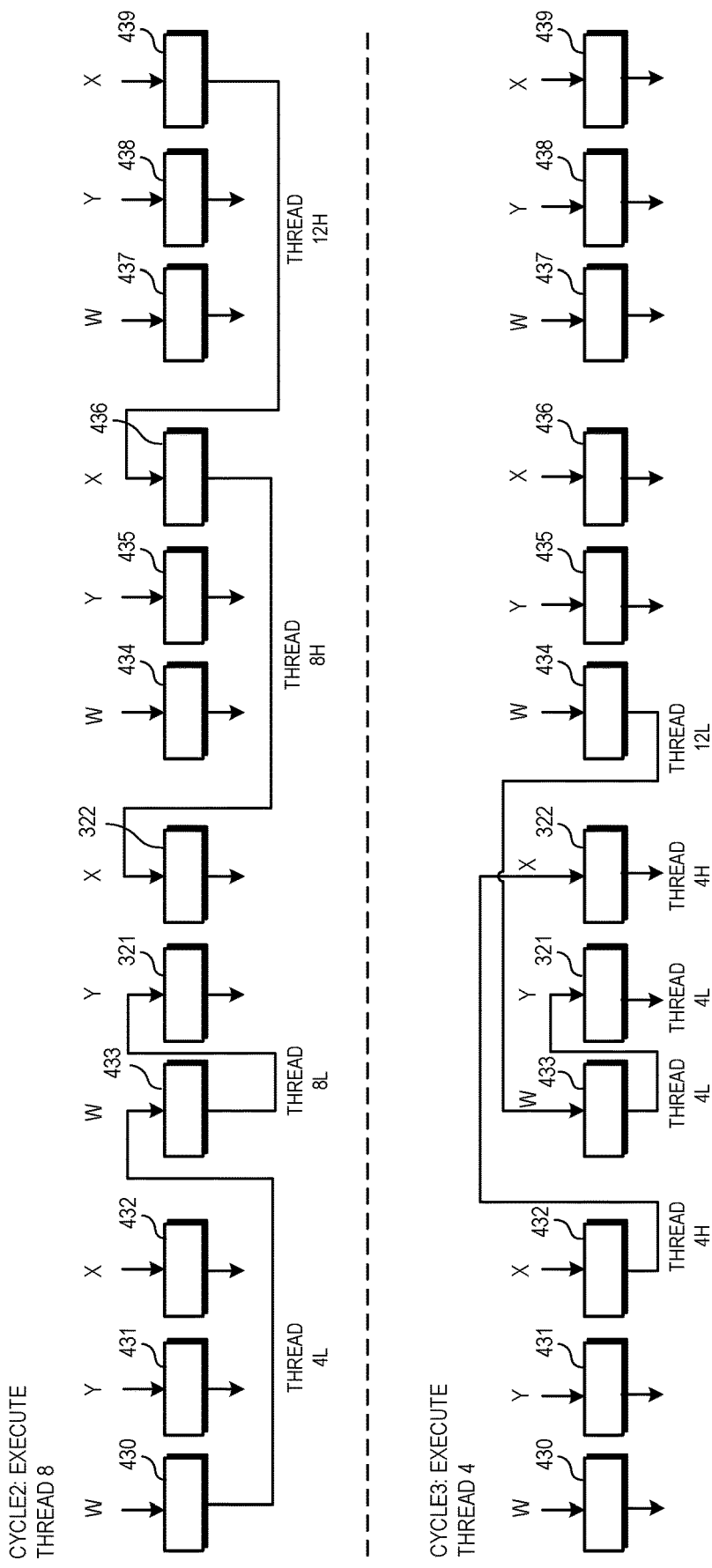
FIG. 5 is a block diagram illustrating another portion of the example sequencing of FIG. 4 in accordance with some embodiments.

FIG. 5 illustrates the next two cycles, designated CYCLE2 and CYCLE3, of the example sequencing operation in accordance with some embodiments. During CYCLE2, the operand sequence control module 110 provides control signaling to further transfer data between the operand registers. In particular, operand 4L is transferred from operand register 430 to operand register 433, operand 8L is transferred from operand register 433 to operand register 321, operand 8H is transferred from operand register 436 to operand register 322, and operand 12H is transferred from operand register 439 to operand register 436. Thus, during CYCLE2, the 8L and 8H operands are stored at the operand registers 321 and 322. Accordingly, during CYCLE2, the DP ALU 116 initiates the double precision operation requested by Thread 8 using the 8L and 8H operands.

During CYCLE3, similar to the previous two cycles, the operand sequence control module 110 provides control signaling to further transfer data between the operand registers. In particular, operand 4L is transferred from operand register 433 to operand register 321, operand 4H is transferred from operand register 432 to operand register 322, and operand 12L is transferred from operand register 434 to operand register 433. Thus, during CYCLE3, the 4L and 4H operands are stored at the operand registers 321 and 322, and the DP ALU 116 initiates the double precision operation requested by Thread 4 using the 4L and 4H operands.

Figure 6:
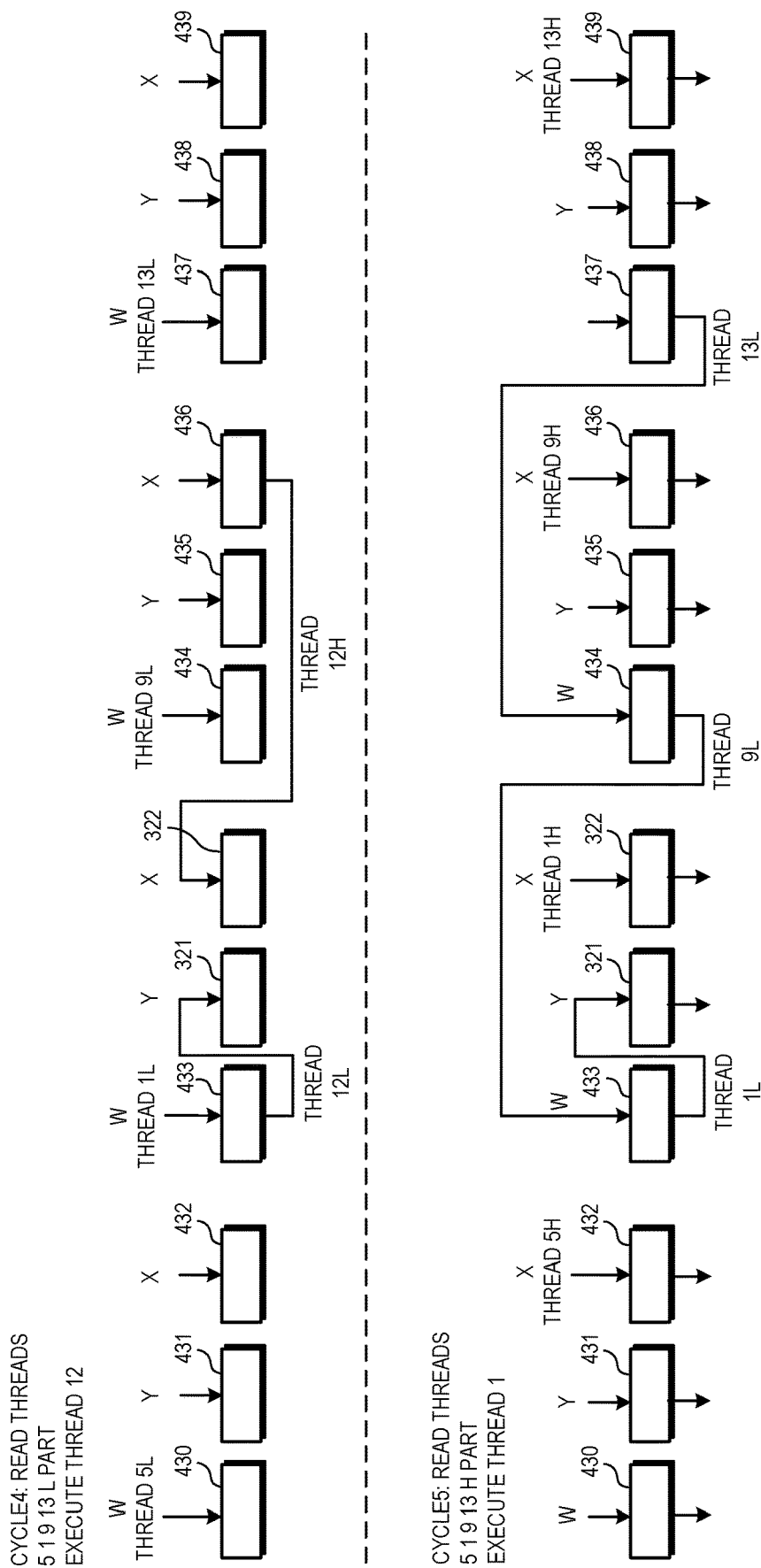
FIG. 6 is a block diagram illustrating yet another portion of the example sequencing of FIG. 4 in accordance with some embodiments.

FIG. 6 illustrates the next two cycles, designated CYCLE4 and CYCLE5, of the example sequencing operation in accordance with some embodiments. During CYCLE4, the operand sequence control module 110 provides control signaling to transfer the last of the initial set of operands between the operand registers. In particular, operand 12H is transferred from operand register 436 to operand register 322, and operand 12L is transferred from operand register 433 to operand register 321. Thus, during CYCLE4, the 12L and 12H operands are stored at the operand registers 321 and 322. Accordingly, during CYCLE4, the DP ALU 116 initiates the double precision operation requested by Thread 12 using the 12L and 12H operands.

In addition, during CYCLE4, the next set of operands for processing are stored at the operand registers. As illustrated, the lower portion of the double precision operands for threads 5, 1, 9, and 13 (designated 5L, 1L, 9L, and 13L, respectively) are read into operand registers. In particular, operand 5L is stored at operand register 430, operand 1L is stored at operand register 433, operand 9L is stored at operand register 434, and operand 13L is stored at operand register 437.

Turning to CYCLE5, the operand sequence control module 110 provides control signaling to transfer data between the operand registers, so that operand 1L is transferred from operand register 433 to operand register 321, operand 9L is transferred from operand register 434 to operand register 433, and operand 13L is transferred from operand register 437 to operand register 434.

In addition, during CYCLE5, the upper portion of the double precision operands for threads 5, 1, 9, and 13 (designated 5H, 1H, 9H, and 13H, respectively) are read into a subset of the operand registers. In particular, operand 5H is stored at operand register 432, operand 1H is stored at operand register 322, operand 9H is stored at operand register 436, and operand 13H is stored at operand register 439. Thus, during CYCLE5, the 1L and 1H operands are stored at the operand registers 321 and 322 and are therefore ready for processing by the DP ALU 116. Accordingly, during CYCLE5, the DP ALU 116 initiates the double precision operation requested by Thread 1 using the 1L and 1H operands.

Figure 7:
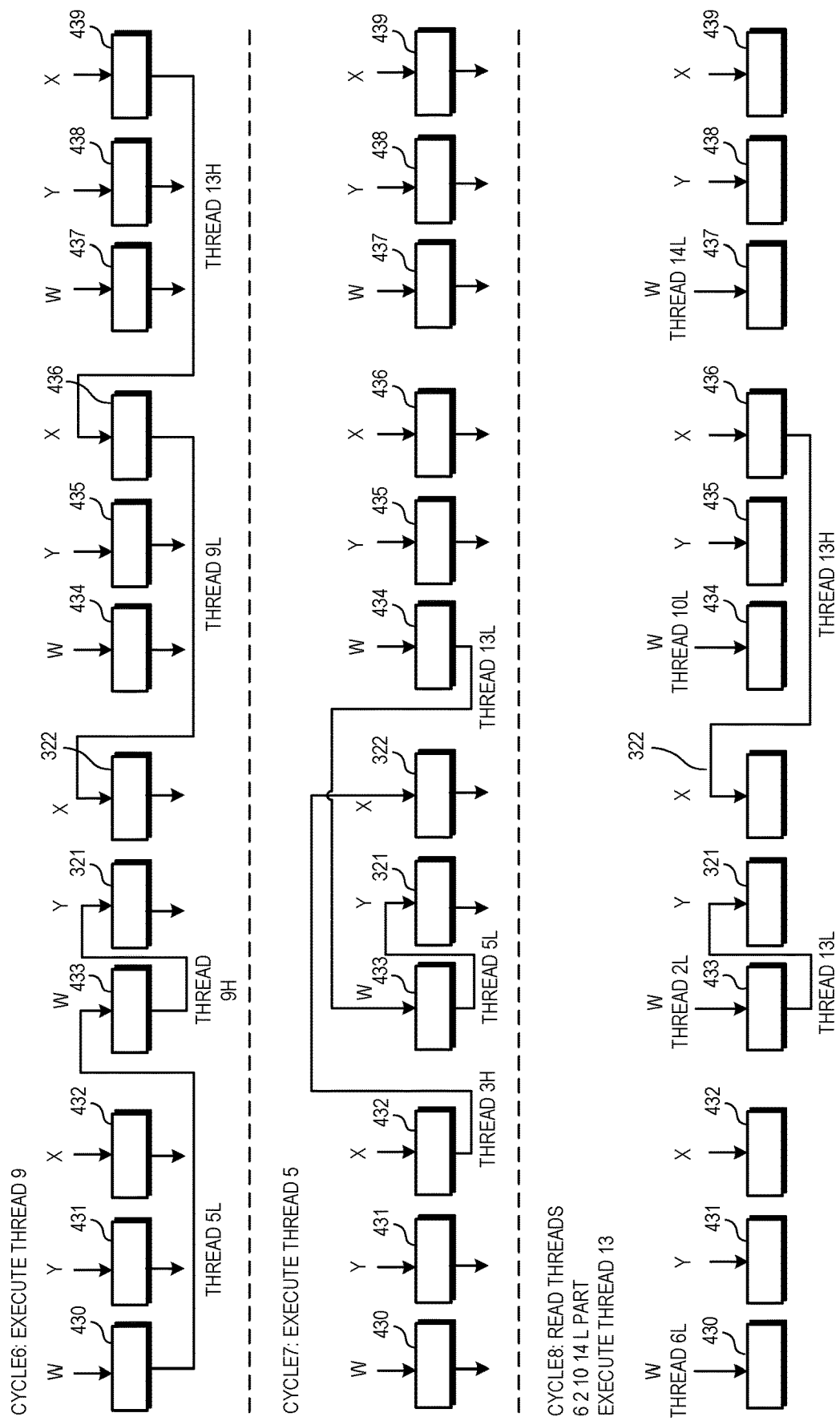
FIG. 7 is a block diagram illustrating still another portion of the example sequencing of FIG. 5 in accordance with some embodiments.

FIG. 7 illustrates the next three cycles, designated CYCLE6, CYCLE7, and CYCLE8, of the example sequencing operation in accordance with some embodiments. During CYCLE6, the operand sequence control module 110 provides control signaling to further transfer data between the operand registers. In particular, operand 5L is transferred from operand register 430 to operand register 433, operand 9L is transferred from operand register 433 to operand register 321, operand 9H is transferred from operand register 436 to operand register 322, and operand 13 is transferred from operand register 439 to operand register 436. Thus, during CYCLE6, the 9L and 9H operands are stored at the operand registers 321 and 322. Accordingly, during CYCLE6, the DP ALU 116 initiates the double precision operation requested by Thread 9 using the 9L and 9H operands.

Turning to CYCLE7, the operand sequence control module 110 provides control signaling to further transfer data between the operand registers. In particular, operand 5L is transferred from operand register 433 to operand register 321, operand 5H is transferred from operand register 432 to operand register 322, and operand 13L is transferred from operand register 434 to operand register 433. Thus, during CYCLE7, the 5L and 5H operands are stored at the operand registers 321 and 322, and the DP ALU 116 initiates the double precision operation requested by Thread 5 using the 5L and 5H operands.

Turning to CYCLE8, the operand sequence control module 110 provides control signaling to transfer the last of the second set of operands between the operand registers. In particular, operand 13H is transferred from operand register 436 to operand register 322, and operand 12L is transferred from operand register 433 to operand register 321. Thus, during CYCLE8, the 13L and 13H operands are stored at the operand registers 321 and 322. Accordingly, during CYCLE8, the DP ALU 116 initiates the double precision operation requested by Thread 13 using the 13L and 13H operands.

In addition, during CYCLE8, the next set of operands for processing are stored at the operand registers. As illustrated, the lower portion of the double precision operands for threads 6, 2, 10, and 14 (designated 6L, 2L, 9L, and 14L, respectively) are read into operand registers. In particular, operand 6L is stored at operand register 430, operand 2L is stored at operand register 433, operand 10L is stored at operand register 434, and operand 14L is stored at operand register 437.

In some embodiments, the GPU 100 continues to sequence provision of operands to and between the operand registers in similar fashion to the illustrated CYCLES0-8 to process operands for the remaining threads, including threads 2, 3, 6, 7, 10, 11, 14, and 15. The GPU 100 thus supports execution of double precision operations for each of the sixteen concurrently executing threads using a single set of double precision operand registers that is shared between the VSPs 102-104. The GPU 100 is thereby able to support double precision operations with a relatively small set of operand registers, thus conserving processor resources such as area and power.

In some embodiments, certain aspects of the techniques described above are implemented by one or more processors of a processing system executing software. The software includes one or more sets of executable instructions stored or otherwise tangibly embodied on a non-transitory computer readable storage medium. The software includes include the instructions and certain data that, when executed by the one or more processors, manipulate the one or more processors to perform one or more aspects of the techniques described above. The non-transitory computer readable storage medium includes one or more of, for example, a magnetic or optical disk storage device, solid state storage devices such as Flash memory, a cache, random access memory (RAM) or other non-volatile memory device or devices, and the like. In different embodiments, the executable instructions stored on the non-transitory computer readable storage medium are represented in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
sequencing, over a plurality of execution cycles, provision of a plurality of operands from a plurality of registers sized to store single precision operands to a first operand register sized to store double precision operands for processing at a first arithmetic logic unit (ALU).

2. The method of claim 1, wherein the sequencing comprises:
during a first execution cycle, storing a first portion of a first operand of the plurality of operands at the first operand register; and
during a second execution cycle, transferring a first portion of a second operand of the plurality of operands from a first register of the plurality of registers to the first operand register.

3. The method of claim 2, wherein the sequencing further comprises:
during the first execution cycle, storing a second portion of the first operand at a second register of the plurality of registers; and
during the second execution cycle, transferring the second portion of the first operand to a second operand register for processing at the ALU.

4. The method of claim 3, further comprising:
during the second execution cycle, reading the first operand from the first and second operand registers at the ALU.

5. The method of claim 4, wherein the first operand is a double precision operand.

6. The method of claim 2, wherein the sequencing further comprises:
during the second execution cycle, transferring a first portion of a third operand from a second register of the plurality of registers to the first register of the plurality of registers.

7. The method of claim 6, wherein the sequencing further comprises:
during a third execution cycle, transferring the first portion of the third operand from the first register of the plurality of registers to the first operand register.

8. The method of claim 6, wherein the sequencing further comprises:
during the second execution cycle, transferring a first portion of a fourth operand from a third register of the plurality of registers to the second register of the plurality of registers.

9. A processor, comprising:
a sequence control module configured to sequence, over a plurality of execution cycles, provision of a plurality of operands from a plurality of registers sized to store single precision operands to a first operand register sized to store double precision operands for processing at an arithmetic logic unit (ALU).

10. The processor of claim 9, wherein the sequence control module is configured to sequence provision of the plurality of operands by:
during a first execution cycle, storing a first portion of a first operand of the plurality of operands at the first operand register; and
during a second execution cycle, transferring a first portion of a second operand of the plurality of operands from a first register of the plurality of registers to the first operand register.

11. The processor of claim 10, wherein the sequence control module is configured to sequence provision of the plurality of operands by:
during the first execution cycle, storing a second portion of the first operand at a second register of the plurality of registers; and
during the second execution cycle, transferring the second portion of the first operand to a second operand register for processing at the ALU.

12. The processor of claim 11, wherein the ALU is configured to:
during the second execution cycle, read the first operand from the first and second operand registers for processing.

13. The processor of claim 12, wherein the first operand is a double precision operand.

14. The processor of claim 10, wherein the sequence control module is configured to sequence provision of the plurality of operands by:
during the second execution cycle, transferring a first portion of a third operand from a second register of the plurality of registers to the first register of the plurality of registers.

15. The processor of claim 14, wherein the sequence control module is configured to sequence provision of the plurality of operands by:
during a third execution cycle, transferring the first portion of the third operand from the first register of the plurality of registers to the first operand register.

16. The processor of claim 14, wherein the sequence control module is configured to sequence provision of the plurality of operands by:
during the second execution cycle, transferring a first portion of a fourth operand from a third register of the plurality of registers to the second register of the plurality of registers.

17. A parallel processing unit (PPU), comprising:
an arithmetic logic unit (ALU);
a plurality of registers sized to store single precision operands and configured to store a plurality of operands; and
a sequence control module configured to sequence, over a plurality of execution cycles, provision of the plurality of operands from the plurality of registers to a first operand register sized to store double precision operands for processing at the ALU.

18. The PPU of claim 17, wherein the sequence control module is configured to sequence provision of the plurality of operands by:
during a first execution cycle, storing a first portion of a first operand of the plurality of operands at the first operand register; and
during a second execution cycle, transferring a first portion of a second operand of the plurality of operands from a first register of the plurality of registers to the first operand register.

19. The PPU of claim 18, wherein the sequence control module is configured to sequence provision of the plurality of operands by:
during the first execution cycle, storing a second portion of the first operand at a second register of the plurality of registers; and
during the second execution cycle, transferring the second portion of the first operand to a second operand register for processing at the ALU.

20. The PPU of claim 19, wherein the ALU is configured to:
during the second execution cycle, read the first operand from the first and second operand registers for processing.

* * * * *